United States Patent [19]

Narui et al.

[11] 3,962,397
[45] June 8, 1976

[54] PRODUCTION OF REFLEXIBLE PIGMENT

[75] Inventors: Hiroshi Narui; Ikuo Akune; Terumi Shinohara, all of Kyoto; Masao Numa, Takatsuki; Yosiya Kobiki, Kyoto, all of Japan

[73] Assignee: Oike & Co., Ltd., Kyoto, Japan

[22] Filed: Nov. 6, 1974

[21] Appl. No.: 521,507

Related U.S. Application Data

[63] Continuation-in-part of Ser. No. 295,908, Oct. 10, 1972, abandoned.

[30] Foreign Application Priority Data

Dec. 22, 1971  Japan.............................. 46-104999
Jan. 25, 1972  Japan................................. 47-9655

[52] U.S. Cl................................ 264/144; 427/162; 427/222; 427/250; 427/404; 427/405; 264/171; 106/308 M
[51] Int. Cl.²......................................... F02M 31/04
[58] Field of Search........... 106/22, 23, 190, 308 M; 427/289, 404, 222; 428/407; 264/144, 171

[56] References Cited
UNITED STATES PATENTS

| | | | |
|---|---|---|---|
| 2,941,894 | 6/1960 | McAdow | 106/29 |
| 3,627,553 | 12/1971 | Clark et al. | 106/300 |
| 3,692,731 | 9/1972 | McAdow | 106/290 |
| 3,697,070 | 10/1972 | McAdow | 106/290 |

*Primary Examiner*—Winston A. Douglas
*Assistant Examiner*—John P. Sheehan
*Attorney, Agent, or Firm*—Stevens, Davis, Miller & Mosher

[57] ABSTRACT

A process for preparing a reflexible pigment consisting of a metal deposition layer and resinous coating layer on at least one side thereof and having a length and width of 0.1 to 500 $\mu$, a thickness of 0.1 to 4 $\mu$ and a true specific gravity of 1 to 2, which is characterized by providing on a base film a metal leaf consisting of a metal deposition layer and a resinous coating layer on at least one side thereof, peeling the metal leaf out of the base film by elongating the base film and crushing up the metal leaf. According to the process, a reflexible pigment in a dry state can be prepared with a remarkable simplicity and a high efficiency. The coating composition including the pigment prepared by the process has improved properties such as beautifulness, reflection property, application property, weatherproofing and abrasion resistance, and is useful for printing ink, writing ink or paint.

17 Claims, 1 Drawing Figure

PRODUCTION OF REFLEXIBLE PIGMENT

CROSS-REFERENCE TO RELATED APPLICATION

The present invention is a continuation-in-part application of copending application Ser. No. 295,908, filed on Oct. 10, 1972 now abandoned.

BACKGROUND OF THE INVENTION

The present invention relates to a novel process for preparing a reflexible pigment consisting of a metal deposition layer and a resinous coating layer on at least one side thereof and having a length and width of 0.1 to 500 $\mu$, a thickness of 0.1 to 4 $\mu$ and a true specific gravity of 1 to 2. The coating composition including the pigment has improved properties such as beautifulness, reflection property, application property, weather-proofing and abrasion property.

Hitherto there has been employed a metal powder such as aluminum powder and bronze powder as a metal pigment for coating composition capable of providing a coated film having metallic luster.

Such a metal powder is prepared by crushing up metal piece into powder. The obtained metal powder has over 30 $\mu$ in diameter and is poor in flatness. Therefore, a coated surface of coating composition including the metal powder is poor in reflection property, and a beautiful coated surface with a metallic luster is hardly obtained. Also the metal powder may not be completely embedded in coating layer, and the resultant surface is not only poor in abrasion resistance but also rough, and is subjected to oxidation to result in discoloration of surface. Besides the metal powder has poor compatibility with binders used in coating composition and can not be employed for various coating compositions, for instance, in case the metal powder is added to the coating composition including cellulose derivative, the dispersed metal powder deposits out of the coating composition on storage. It is also known that, in case of crushing up a metal piece into the metal powder, stearic acid is added in order to prevent the aggregation of metal powder caused by action of compression, defacement, impingement or shearing in the course of crushing and to give a metallic luster on the resultant metal powder, and therefore the obtained metal powder is coated with stearic acid. The layer obtained by employing the metal powder coated with stearic acid, however, has poor abrasion resistance since the affinity between such a metal powder and binder is very small and the powder is difficult to be fixed on the coated surface.

Besides conventional metal powder has a shape of particle or the similar, in other words, is not plane. Thus the coated layer including conventional metal powder has poor hiding ability and therefore large amounts of metal powder are required to give a sufficient metallic luster, which is a disadvantage economically.

The coating composition including conventional metal powder provides a layer having dark gold or silver surface which possesses poor reflexible property. In case of employing colorant as is red, blue or green, such a coating composition can not give a desired beautiful surface having a good metallic luster since it is difficult to provide a clear coating layer.

On the other hand, there has been known a process for preparing a reflexible pigment which is characterized by providing a solvent-soluble releasing layer on a base film, providing thereon a metal leaf which consists of a metal film surfaced on both sides with a solvent-insoluble resinous layer, removing the metal leaf from the base film by dissolving away the releasing layer with organic solvent to give a slurry of the metal leaf in the solvent, and agitating the slurry to crush up the metal leaf into minute pieces (see U.S. Pat. No. 3,692,731 and U.S. Pat. No. 3,697,070).

In the process, a reflexible pigment is obtained as a slurry in solvent, namely, in a wet state. However, the pigment in a wet state can not be sieved to classify into fractions having constant particle sizes. Furthermore, the pigment in a wet state is disadvantageous for its utilization, storage or transportation. Then, it may be reminded to obtain a pigment in a dry state from such a wet pigment. However, for this, there must be employed a tedious separation method such as filtration including the removing of dissolved releasing layer by washing away.

As described above, the process directed to removing a metal leaf from a base film by dissolving away a solvent-soluble releasing layer interposed between the base film and the metal leaf with a solvent is not preferable for the mass-production of a reflexible pigment.

OBJECTS OF THE INVENTION

An object of the present invention is to provide a process for preparing a reflexible pigment which is capable of providing a coated film with a metallic luster and excellent properties such as beautifulness, reflexible property, application property, weather-proofing and abrasion resistance.

Another object of the invention is to provide a process for preparing a reflexible pigment which is suitable for a printing ink which gives a printed image having metallic luster and can be preserved in stable for a long period without any deposition of metal powder as a pigment from the ink.

Further object of the invention is to provide a process for preparing a reflexible pigment which is suitable for a writing ink which gives a written image having metallic luster and can be preserved in stable for a long period without any deposition of metal powder as a pigment from the ink.

More further object of the invention is to provide a process for preparing a reflexible pigment which is suitable for a paint which gives a coated surface having a metallic luster and can be preserved in stable for a long period without any deposition of metal powder as a pigment from the paint.

Still further object of the invention is to provide a process for preparing a reflexible pigment which is able to remarkably increase a reflexible property even with only a few amount.

Still more further object of the invention is to provide a process for preparing a reflexible pigment in dry state with a remarkable simplicity and high efficiency.

These and other objects will be apparent from the description hereinafter.

DETAILED DESCRIPTION OF THE INVENTION

Figure 1:
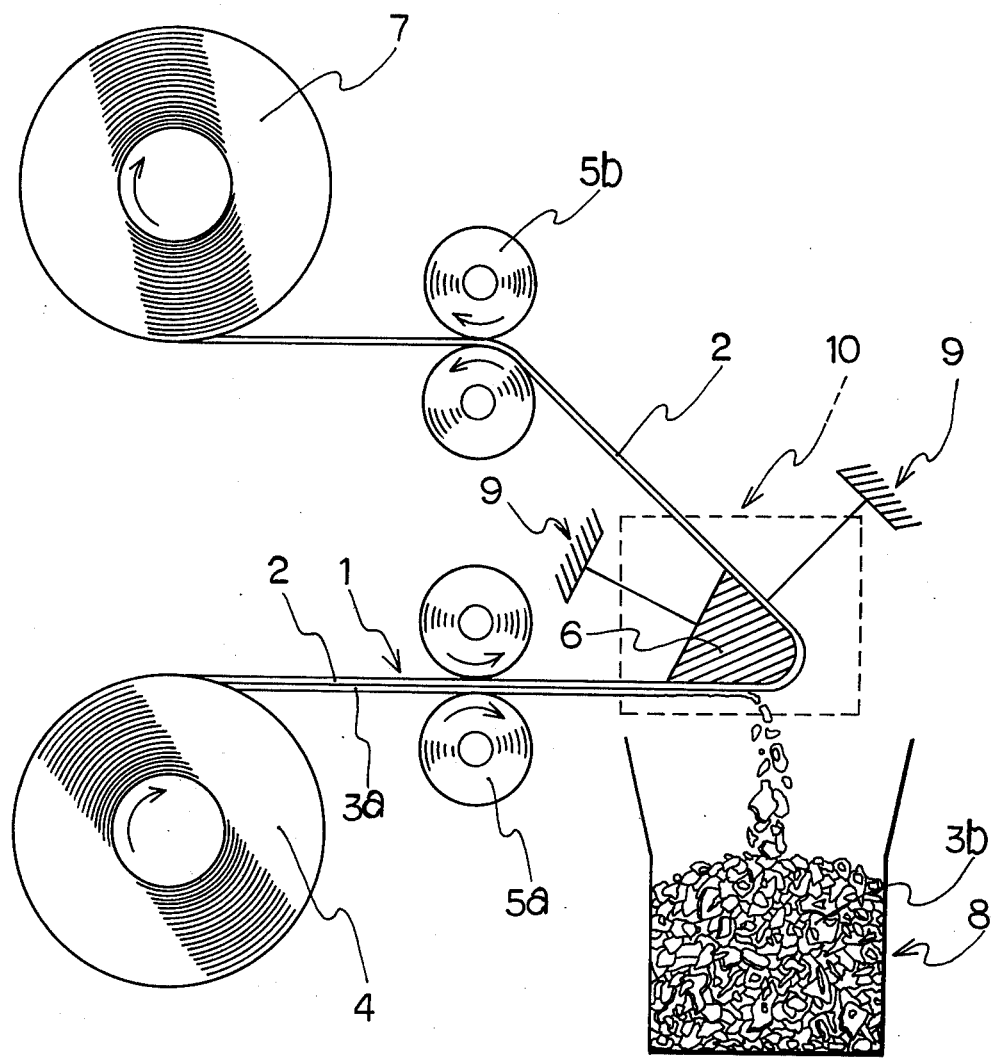
FIG. 1 shows the outline of an embodiment for peeling a metal leaf out of a base film according to the process of the present invention.

It has now been found that the above objects can be accomplished by preparing a reflexible pigment consisting of a metal deposition layer and a resinous coating layer on at least one side thereof and having a length and width of about 0.1 to about 500 μ, respectively, a thickness of about 0.1 to about 4 μ and a true specific gravity of about 1 to about 2, which consists essentially of:

a. applying a resinous coating material onto a base film to give an under-coating layer,
b. depositing a metal vapor onto the undercoating layer to give a metal deposition layer,
c. applying a resinous coating material onto the metal deposition layer to give an over-coating layer, either of the under-coating layer or the over-coating layer being omissible,
d. elongating the base film in a ratio of not less than about 1% in air to peel a metal leaf consisting of the two or three layers out of the base film, and
e. crushing up the metal leaf into minute pieces in air.

According to the process of the present invention, a reflexible pigment in a dry state is directly obtained since the peeling of a metal leaf out of a base film and the crushing of the metal leaf into minute pieces are carried out in air. Therefore, the process of the present invention is remarkably useful for the mass-production of a reflexible pigment in a dry state.

A reflexible pigment prepared according to the process of the present invention is arranged in parallel with the coated base due to its improved planarity to form a thin coating layer and give a smooth surface. As a result, reflexible property and abrasion resistance of the coated surface can be extremely improved and further discoloration of the pigment in air can be prevented since the pigment is completely covered with binder of the coating composition and the surface thereof is not oxidized.

The pigment of the present invention is covered with a resinous coating layer, and accordingly the pigment of the invention has an excellent affinity to vehicle of the coating composition and can be uniformly dispersed into the composition without any deposition. Thus a composition including the pigment is well preserved for a long time.

The pigment may be colored by adding a colorant into the resinous coating layer. Therefore, only by employing the pigment without adding any other colorant into the coating composition, the composition can provide a beautiful colored, reflexible coated layer having clean and metallic surface.

Furthermore, the coating composition including the pigment of the invention has good reflexible property, and accordingly it can also provide a beautiful colored, reflexible coated layer having clean and metallic surface by adding various colorants as are red, blue, green, etc. into the composition. The pigments included within the thin coated layer are arranged in parallel with a base on which the composition is applied. Therefore the coated layer has larger hiding power and heat-insulating effect in accordance with its reflexible property, and the amount employed of the pigment can be extremely reduced to about 1/10 to about 1/50 by weight compared with that of conventional metal powder.

Preferred pigment for paint is in the range of about 1 to about 500 μ in length and width and about 0.1 to about 4 μ in thickness, for writing ink is in the range of about 0.1 to about 20 μ in length and width and about 0.1 to about 1.5 μ in thickness, and for printing ink is in the range of about 3 to about 200 μ in length and width and about 0.1 to about 2 μ in thickness.

In case of length and width being less than the above-mentioned range, a plane surface of the pigment becomes too small and hence metallic luster and reflection are lost, and being more than the range, the pigment becomes immiscible with vehicle of the coating composition, floats on the composition and further is folded or crumpled during dispersing it into the composition or during applying to result in an uneven coating composition and rough coated surface because of losing its self-supportability. In case of the thickness of the pigment being less than the above-mentioned range it is difficult to obtain a metallic surface, and in case of more than the range the pigment is hardly covered within the coating layer which is apt to become rough and thick. When the pigment is employed for gravure printing ink, the pigment within the coating layer can not help to exist merely as one layer since the printed film is very thin as 2 to 5 μ in thickness, and therefore a part which is not covered with the vehicle of the printing ink is appeared and the pigment is scraped out of a cylinder by a doctor in the course of printing. Accordingly, the printing surface having metallic luster can not be obtained.

The pigment is extremely minute and the true specific gravity is 1 to 2 (apparent specific gravity: about 0.001 to about 0.5), and therefore it can be stably and uniformly dispersed into the coating composition consisting of resin and solvent because of its good affinity to the composition. In case of the true specific gravity being less than 1, such a pigment can not be employed practically because of floating out of the composition.

The pigment having the above-mentioned characteristics can be included up to about 50% by weight in a coating composition. In case of the amount of the pigment included in the composition being less than about 0.1% by weight, the base applied can not be completely covered over with the pigment as is too little and good reflexible property is not obtained. In case of more than about 50% by weight, it is difficult to disperse the pigment into the composition and the viscosity of the composition is remarkably raised. Thus the composition can not be preserved for a long time and is hardly applied. Further, the coated surface has a small impact resistance and is readily broken up to result in peeling from the base since the cohesive force of the coating composition is very small.

As a resin employed for the resinous coating layer of the metal leaf, there may be employed thermoplastic resin, thermosetting resin and a mixture thereof. Particularly, when a mixture of thermoplastic resin and thermosetting resin is employed for the resinous coating layer, the pigment having such a resinous coating layer can be dispersed more successfully into the composition.

The presence of thermosetting resin in the resinous coating layer can prevent to occur blocking of the pigment with each other and to dissolve thermoplastic resin therein even by the heat caused by crushing the metal leaf on which the resinous coating layer is provided. The presence of thermoplastic resin can improve its affinity to binder and therefore the pigment is uniformly dispersed into the coating composition.

According to the process of the present invention, a reflexible pigment can be prepared by crushing a metallic vacuum deposition leaf on which resinous coating layer is provided. That is, an under-coating layer is provided on a base film on which metal is able to deposit under a vacuum. The under-coating layer is provided with about 0.1 to about 4 μ in thickness by means of, for instance, gravure printing method or roll coating method. Thereon metal is deposited with about 0.03 to about 0.1 μ in thickness under a vacuum of about $1 \times 10^{-2}$ to about $1 \times 10^{-6}$ Torrs at an evaporation temperature of about 200° to about 2,000°C., in which a degree of vacuum and evaporation temperature vary according to a kind of metal. Further onto the metal deposition layer an over-coating layer is provided with about 0.1 to about 4 μ in thickness. The resin employed for the over-coating layer may be different from that of the under-coating layer and either of two layers is omissible. Thus obtained metal leaf consisting of two or three layers is peeled out of the base film by the elongation of the base film and the recovered pieces of the metal leaf are crushed. Thus, the desired pigment having resinous coating layer can be readily obtained.

As a resin for resinous coating layer, either of thermoplastic resin and thermosetting resin can be employed and preferably a mixture of both is suitably employed. An aqueous or organic solvent solution of resin is applied onto the base film of which surface may be smooth or mat.

Suitable thermoplastic resins employed for the resinous coating layer are, for instance, acrylic resin, polyester, polyamide, vinyl chloride-vinyl acetate copolymer, ethylene-vinyl acetate copolymer, polyvinyl butyral, polystyrene, maleic resin, petroleum resin, ester gum, cellulose nitrate, ethyl cellulose, cellulose acetate, rosin, shellac, and the like.

Suitable thermosetting resins employed for the resinous coating layer are, for instance, thermosetting type acrylic resin such as epoxy-modified acrylic resin, epoxy resin, urethane resin, urea resin, melamine resin, phenolic resin such as novolak type or resol type, alkyd resin, unsaturated polyester resin, and the like.

The ratio of thermoplastic resin and thermosetting resin, in case of mixing them, varies according to a kind of resins employed, but in general, is suitably in the range of about 50 to about 200 parts by weight of thermosetting resin to 100 parts by weight of thermoplastic resin. In case thermosetting resin is more than the above range, the obtained pigment tends to become hard and frangeble. In case thermosetting resin is less than the above range, the resin provided on the surface of metal layer tends to dissolve in organic solvent.

Colorants may be added to the resinous coating layer on the surface of the metal leaf. Examples of the colorant are organic pigments capable of giving a translucent coating layer, such as cyanine type, quinacridone type, azo type, polyazo type, isoindolinone type, nitroso type and phthalo-cyanine type, and dyestuffs, especially solvent dyes. The organic pigment may be preferably employed because of its excellent weatherproofing property.

Examples of the metal to be deposited are gold, silver, aluminum, copper, nickel, tin, chromium, zinc, and the like.

Examples of the base film include films made of polyethylene, polypropylene, polyvinyl alcohol, polytetrafluoroethylene, polyester such as polyethylene terephthalate, polyamide such as Nylon, polyvinyl chloride, polycarbonate, cellulose acetate, regenerated cellulose, and the like. The preferable thickness of these films ranges from about 6 μ to about 100 μ.

The metal leaf provided on a base film is peeled out of the base film by elongating the base film in air. The peeling of metal leaf can be readily carried out by elongating the base film in a ratio of not less than about 1%. The upper limit of the elongation ratio is not critical and may be below a breaking point of the base film employed. Generally, however, an elongation ratio of not more than about 20% is preferable from the viewpoint of the reuse of base film and since it is in vain to elongate the base film in a ratio of more than about 20% for the purpose of peeling the metal leaf. In case of a film being ease to be elongated at a room temperature, for instance, unstretched film, uniaxially stretched film and biaxially low stretched film, the peeling of metal leaf is carried out by elongating the base film in a ratio of about 1 to about 20% at a room temperature. In case of a base film being difficult to be elongated at a room temperature, for instance, biaxially highly stretched polyethylene terephthalate film, the peeling of metal leaf is carried out by elongating the base film in a ratio of about 1 to about 20% with heating the base film at an elevated temperature so that the base film can be readily elongated within the above range. The heating temperature is preferably selected from a temperature range being close to the glass transition temperature of the base film employed. In case of a polyester film, polyamide film or polyvinyl alcohol film as a base film, there may occur a case that the peeling of metal leaf becomes difficult according to a kind of resins employed for under-coating layer. In that case, it is better to provide a releasing layer between base film and under-coating layer. A kind of releasing agent veries depending upon a kind of base film and a kind of resins employed for under-coating layer. Generally, wax and silicone are preferably employed.

The peeling step of metal leaf from the base film can be better understood with reference to the accompanying drawing which is the schematic representation of the one specific embodiment.

In FIG. 1, a film 1 consisting of a base film 2 and a metal leaf 3a wound up on a supply spool 4 is wound back from the supply spool 4, passes through a pair of tension rollers 5a and passes over a guide bar 6. The base film 2 is subjected to a tension between the tension rollers 5a and a guide bar 6 and thereby elongated in a ratio of not less than about 1%, preferably from about 1 to about 20%, to peel the metal leaf 3a therefrom in the vicinity of the guide bar 6. The tension to the base film 2 is regulated by changing the ratio of the rotating velocity of the tension rollers 5a to that of the tension rollers 5b. The base film 2 out of which the metal leaf 3a is peeled passes through a pair of tension rollers 5b and is wound up onto a take-up spool 7. The metal leaf 3a peeled out of the base film 2 becomes pieces 3b of a variety of dimensions, for instance, from about 1 mm. to a dimension corresponding to the width of base film employed. The pieces 3b of the metal leaf are recovered into a container 8. 9 is an earthing. If necessary, the elongation of base film may be carried out with heating a heating zone 10 to assist the elongation.

Thus obtained pieces of the metal leaf are crushed up by a conventional pulverizing means such as ball mill, hammer mill and colloid mill to give the pigment of the present invention. Preferably the pigment takes the size of about 1 to about 500 μ for paint, of about 0.1 to about 20 μ for writing ink, and of about 3 to about 200 μ for printing ink.

In case the pigment thus obtained is employed for paint, it may be admixed and dispersed into a mixture of resin, solvent, plasticizer, and the like by the same manner as in a conventional process of producing a paint.

Examples of the resin for paint are alkyd resin, modified alkyd resin such as phenol-modified alkyd resin, phenol resin, modified phenol resin, cellulose nitrate, ethyl cellulose, cellulose acetate, polyester, urea resin, melamine resin, vinyl acetate-ethylene copolymer, polyacrylate, polystyrenes, ester gum, copal, mixed ester resin of abietilate and maleate, abietilate, chlorinated rubber, isomerized rubber, epoxy resin, urethane resin, and the like.

Examples of the solvent for paint are acetone, methyl ethyl ketone, methyl isobutyl ketone, diisobutyl ketone, methyl alcohol, ethyl alcohol, butyl alcohol, diacetone alcohol, ethyl acetate, butyl acetate, amyl acetate, toluene, xylene, cyclohexane, petroleum ether, solvent naphtha, mineral spirit, n-heptane, ethyl cellusolve, butyl cellosolve, isophorone, water, and the like.

Examples of the plasticizer for paint, which may be employed, if desired, are phthalic acid derivatives, adipic acid derivatives, azelaic acid derivatives, fumaric acid derivatives, trimellitic acid derivatives, stearic acid derivatives, sulphonic acid derivatives, phosphoric acid derivatives, and the like.

If necessary, colorants may be added into the mixture of resin, solvent, plasticizer and the others, whereby the paint may be colored into any desired colors such as red, blue, green and pink other than gold and silver.

Furthermore, there may be optionally added the additives such as antioxidant, ultraviolet absorbing agent, stabilizer, and antiflame agent.

In case the pigment is employed for printing ink, particularly in which the pigment with coating layer consisting of thermoplastic resin and thermosetting resin is suitable, for instance, about 0.1 to about 20 parts by weight of pigment is added into a mixture consisting of 0 to about 40 parts by weight of binder such as rosin, cured rosin, cyclized rubber, chlorinated rubber, modified phenolic resin, ethyl cellulose, polyamide, vinyl resin, ester gum, copal, epoxy resin, polyacrylate or urethane resin, 0 to about 20 parts by weight of body pigment such as silica white, magnesium carbonate or alumina white, about 40 to about 90 parts by weight of liquid medium such as vegetable oil, linseed oil, china-wood oil, bean oil, castor oil, acetone, methyl ethyl ketone, methyl butyl ketone, diisobutyl ketone, methyl alcohol, ethyl alcohol, butyl alcohol, diacetone alcohol, ethyl acetate, butyl acetate, amyl acetate, toluene, xylene, cyclohexanone, petroleum ether, solvent naphtha, mineral spirit, n-heptane, ethyl cellosolve, butyl cellosolve, isophorone or water, and additives such as was, plasticizer and dispersing agent. The mixture is admixed through a mixing roll and then the viscosity is adjusted by the addition of solvent. A dyestuff or pigment may be optionally added into the above composition.

In case the pigment of the present invention is for writing ink, about 10 to about 50% by weight of the pigment is added to a mixture consisting of, for instance, resin, viscosity adjusting agent, surface active agent, dispersing agent, stabilizer and solvent. Examples of the resin employed in the writing ink are rosin, rosin-modified maleic resin, polymerized rosin, maleic resin, polyvinyl alcohol, acacia, ethyl cellulose, and the like. Examples of the liquid medium employed in the writing ink are ethyl cellosolve, butyl cellosolve, isopropyl alcohol, butyl alcohol, toluene, butyl acetate, glycerin, hexylene glycol, water, and the like. Furthermore dyestuff and pigment as a colorant may be added to the writing ink in accordance with the necessity.

Thus obtained paint, printing ink and writing ink can be applied on a raw stock in the same manner as in a conventional method.

The paint including the pigment of the present invention can be applied with a few microns to several hundred microns in thickness by means of pallet coating, brush coating, air spraying, roller coating, immersing, dipping, electrodeposition, and the like. The present reflexible paint can be employed for mark, polychrome print or aventurine lacquer, ornament, blocking foil, heat reflecting, gold or silver thread, etc. Especially, the present paint is useful for mark due to its high reflexible property. Furthermore an iridescent pattern can be also obtained by combining the various colored pigments of the invention and a fluorescent dyestuff or pigment.

According to the paint including the pigment of the present invention, the coated surface having a metallic luster and high reflexible property of various patterns is readily obtained as stated above by mere coating means instead of metallizing by a sectional metal depositing or a metal vapor depositing of plasticized sheet which hitherto have been considered to be difficult to practice since the coated surface has the same reflexible property as the surface of deposited metal leaf.

The printing ink including the pigment of the present invention can be employed as a gravure printing ink or offset printing ink, in which its composition may varies according to the purpose. The printing ink may be employed in that condition, but the paste for storage ink obtained by evaporating solvent may be practiced after adjusting the viscosity by adding solvent.

A main binder material is drying vegetable oil for offset printing ink and is synthetic resin for gravure printing ink.

The writing ink including the pigment of the present invention can be employed for ball-point pen, sign pen, fountain pen and lettering.

The reflexible writing ink may also be prepared by adding the pigment of the invention into a commercial ink.

The following Examples are given to illustrate the process of the present invention.

Example 1

On a biaxially stretched polyethylene terephthalate film (stretching ratio: 3 times in the longitudinal direction and 2.5 times in the transverse direction) having a thickness of 12 $\mu$ was applied a 2% by weight solution of a fatty acid ester-modified wax in toluene and dried to give a releasing layer. On the releasing layer was applied by means of gravure method (hereinafter every application was carried out by gravure method) an under-coating material consisting of 10 parts by weight of urea resin, 5 parts by weight of cellulose nitrate, 5 parts by weight of polyvinyl acetate, 20 parts by weight of ethyl alcohol, 15 parts by weight of n-butyl alcohol, 15 parts by weight of ethyl acetate and 30 parts by weight of toluene. The applied coating was dried in an oven of 150°C. for 60 seconds to give an under-coating layer having a thickness of 1 $\mu$. Aluminum was deposited on the under-coating layer under a vacuum of 3 ×

$10^{-4}$ Torrs at an evaporation temperature of 1,400°C. to give an aluminum deposition layer having a thickness of 0.03 to 0.06 $\mu$. Then the same coating material as the under-coating material was applied onto the aluminum deposition layer and dried to give an over-coating layer having a thickness of 1 $\mu$.

The aluminum leaf provided on the base film was peeled out of the base film by employing the apparatus as illustrated in FIG. 1. The base film having the aluminum leaf thereon was subjected to a tension between the tension rollers 5a and the gide bar 6 by regulating the ratio of the rotating velocity of the tension rollers 5a to that of the tension rollers 5b and at the same time heated up to about 80°C. by heating a heating zone 10 by means of an infrased heater to elongate the base film in a ratio of about 80%. Thereby, the aluminum leaf on the base film was peeled out of the base film in the vicinity of the guide bar 6 to give pieces of the aluminum leaf of 1 to 10 mm. in dimension.

The pieces of the aluminum leaf was further crushed up by means of a hammer mill to a silver pigment having a length and width of 25 to 50 $\mu$, a thickness of 2 $\mu$ and a specific gravity of 1.4.

Employing thus obtained pigment of the invention and a conventional aluminum powder, the following coating compositions (A) and (B) for mark were prepared by utilizing kneader of roll type.

| Ingredients | Parts by weight | |
|---|---|---|
| | (A) | (B) |
| Silver pigment | 20 | — |
| Aluminum powder | — | 200 |
| Toluene | 180 | 180 |
| Benzene | 300 | 300 |
| Acetone | 240 | 240 |
| Ethyl acetate | 240 | 240 |
| Butyl acetate | 240 | 240 |
| Polymethyl methacrylate | 240 | 240 |
| Benzoyl peroxide | 3 | 3 |

On a plastic board was sprayed thus obtained composition with a layer of 40 to 50 $\mu$ in thickness. After semi-drying, the sprayed board was scattered as one layer consisting of a great number of glass beads, in a closest state, having a diameter of 50 to 80 $\mu$ and a refractive index of 1.9 to 2.0 and dried to obtain a mark board.

The reflexible property of thus obtained mark board (A') and (B') were compared. The mark board (B') lighted by a flashlight at night could not be seen at a distance of about 30 m. On the contrary the mark board (A'), of which the pigment contents were 1/10 times of the aluminum powder employed in mark board (B'), showed an excellent reflexible property that it could be seen even at a distance of about 100 m. Furthermore the coated layer of mark board (B') was cracked by bending of 30° and peeled out of the base by bending of 90°, while the coated layer of mark board (A') did not show any cracking even at bending of 120°. Also the coating composition (A) had higher abrasion resistance in comparison with the composition (B).

Example 2

Employing the pigment of metal leaf prepared in Example 1, a paint for mark of the following composition was prepared by utilizing a ball mill.

| Ingredients | Parts by weight |
|---|---|
| Silver pigment | 50 |
| Alkyd resin-chlorinated rubber type paint | 1,000 |
| Glass beads (of 0.06 to 0.02 mm. in diameter | 500 |
| Titanium dioxide | 200 |

Thus obtained paint was applied to mark a pedestrians' crossing on a road by brushing means.

The mark on the road showed an excellent reflection and abrasion resistance.

Example 3

On an unstretched polypropylene film having a thickness of 20 $\mu$ was applied an under-coating material consisting of 5 parts by weight of maleic acid resin, 15 parts by weight of phenol resin, 5 parts by weight of polyvinyl butyral, 0.1 part by weight of hexamethylenetetramine (catalyst), 2 parts by weight of ethyl alcohol, 10 parts by weight of n-butyl alcohol, 20 parts by weight of ethyl acetate, 25 parts by weight of toluene and 5 parts by weight of blue dyestuff. The applied coating was dried by utilizing a hot air dryer of 60°C. for 10 seconds to give an under-coating layer having a thickness of 1.5 $\mu$. Silver was deposited onto the under-coating layer under a vacuum of $3 \times 10^{-4}$ Torrs at a temperature of 1,500°C. to give a silver deposition layer having a thickness of 0.05 to 0.08 $\mu$. Furthermore the same coating material as the under-coating material was applied onto the silver deposition layer and dried to give an over-coating layer having a thickness of 1.5 $\mu$.

Thus obtained silver leaf was peeled out of the polypropylene film in the same manner as described in Example 1 except that the elongating ratio was altered to about 5% and the elongating temperature to a room temperature, and then crushed up to give a blue pigment having a length and width of 10 to 30 $\mu$, a thickness of 3.1 $\mu$ and a specific gravity of 1.5.

A paint for giving an iridescent pattern was prepared by mixing the following composition in a ball mill.

| Ingredients | Parts by weight |
|---|---|
| Blue pigment | 0.02 |
| Polyamide | 30.0 |
| Denatured alcohol | 20.0 |
| Ethyl acetate | 10.0 |
| Fluorescent pink paint | 5.0 |

The obtained paint was applied onto a polyvinyl chloride sheet by a roller and then dried to give a beautiful iridescent pattern like that many pieces of mother-of-pearl are enchased on a pink base.

Example 4

Employing the blue pigment prepared in Example 3, a paint having the following composition was prepared by mixing in a ball mill.

| Ingredients | Parts by weight |
|---|---|
| Blue pigment | 2 |
| Clear lacquer | 100 |

| Ingredients | Parts by weight |
|---|---|
| Thinner | 20 |

The obtained composition was sprayed on an undercoated surface of black to form a beautiful aventurine pattern having a good reflexible property, like that many pieces of mother-of-pearl are enchased on a black base.

Example 5

Employing the blue pigment prepared in Example 3, a blue reflexible paint was prepared by mixing the following composition in a homomixer.

| Ingredients | Parts by weight |
|---|---|
| Blue pigment | 2 |
| Varnish | 100 |
| Thinner | 10 |

The obtained paint was applied on a furniture, of which surface is reflexible and clear.

Example 6

A red pigment was prepared by the same manner as described in Example 3 except that a red dyestuff was employed instead of blue dyestuff. Employing the red pigment and the blue pigment prepared in Example 3, the following composition was admixed by a ball mill to prepare a paint for providing an iridescent pattern.

| Ingredients | Parts by weight |
|---|---|
| Cellulose nitrate | 100 |
| Alkyd resin modified with non-drying oil | 100 |
| Dibutyl phthalate | 20 |
| Denatured alcohol | 200 |
| Blue pigment | 5 |
| Red pigment | 5 |

A furniture sprayed with the obtained paint showed a reflexible iridescent pattern consisting of red and blue spots.

Example 7

Employing the blue pigment prepared in Example 3, the following coating composition was prepared by mixing in a ball mill.

| Ingredients | Parts by weight |
|---|---|
| Blue pigment | 5 |
| Olefin wax | 50 |
| Polyethylene wax | 5 |
| Solvent naphtha | 50 |

On a paper treated with releasing agent was applied thus obtained coating composition by a reverse roll coater to provide a hot stamping foil. Thus obtained hot stamping foil was pressed by a hot metal pattern onto a book or label to give a beautiful blue pattern having semi-metallic luster.

Example 8

The following coating compositions were applied on a paraffin paper by a silk screen printer to give a polychrome print consisting of silver, red and blue colors.

| | Ingredients | Parts by weight |
|---|---|---|
| (A) | Silver pigment | 5 |
| | Acrylic resin (thermoplastic) | 50 |
| | Toluene | 20 |
| | Xylene | 30 |
| (B) | Red pigment | 10 |
| | Acrylic resin (thermoplastic) | 50 |
| | Toluene | 20 |
| | Xylene | 30 |
| (C) | Blue pigment | 8 |
| | Acrylic resin (thermoplastic) | 50 |
| | Toluene | 20 |
| | Xylene | 30 |

Thus obtained hot stamping foil superposed on a paper was pressed by utilizing a silicone rubber for hot stamping to give the polychrome print. The pattern could be obtained without any trouble of printing, and the transferred pattern has a excellent abrasion resistance and a metallic luster.

Example 9

The following composition was employed in a roll textile printing of a cotton fabrics.

| Ingredients | Parts by weight |
|---|---|
| Tragant paste | 35.0 |
| Acramine binder FWR (made by Beyer A.G.) | 20.0 |
| Aquafix FH (made by Beyer A.G.) | 45.0 |
| Water | 5.5 |
| Silver pigment | 10.0 |

The printed cotton fabrics were subjected to baking at a temperature of 100° to 130°C. for 3 minutes. The obtained printed fabrics has a more beautiful pattern of silver color than that of employing conventional metal powder, and abrasion resistance was favorable.

Example 10

A thermo-reflexible paint of the following composition was prepared.

| Ingredients | Parts by weight |
|---|---|
| Alkyd resin modified with fatty acid (solid contents: 50%) | 100 |
| Malachite green | 20 |
| Blue pigment | 5 |

On an outer surface of one liter cylindrical can was sprayed the paint with a layer of 100 $\mu$ in thickness. Furthermore, on another can was sprayed a paint including no blue pigment.

The both cans were exposed under two infrared lamps (100V, 25W) and the elevation of temperature on the surface was measured. The elevation of temperature of can on which the paint including no pigment was sprayed was 50°C. and that of can on which the above paint was sprayed was only 20°C. The above result showed an excellent thermo-reflexible property.

Example 11

A gold pigment was prepared in the same manner as described in Example 1 except that a yellow dystuff was employed additionally.

A paint for gold thread of the following composition was prepared.

| Ingredients | Parts by weight |
| --- | --- |
| Cellulose nitrate (isopropyl alcohol content: 3%) | 7.0 |
| Ester gum | 9.0 |
| Tricresyl phosphate | 1.0 |
| Methyl isobutyl ketone | 23.0 |
| N-butyl alcohol | 5.0 |
| Toluene | 45.0 |
| Maleic acid | 0.5 |
| Gold pigment | 0.5 |

Employing a red dyestuff instead of the gold pigment, a red paint of the above composition was prepared.

Both paints were applied on a cellophane paper in stripe. After drying, it was cut in width of 0.3 mm. and the obtained threads were woven to give a beautiful fabric having a favorable abrasion resistance in comparison with conventional one.

Example 12

The procedure in Example 1 was repeated except that the under-coating and over-coating materials consisting of 3.3 parts by weight of polyvinyl butyral, 33.3 parts by weight of phenol resin solution (non-volatile component: 60%) being able to be cured at room temperature and 63.4 parts by weight of denatured alcohol were employed instead of the coating material in Example 1 to give a pigment having a length and width of 10 $\mu$, a thickness of 1.6 $\mu$ and a true specific gravity of 1.3.

A ball mill was charged with 2 parts by weight of yellow dyestuff (Benzidine yellow), 20 parts by weight of polyamide, 15 parts by weight of toluene, 15 parts by weight of ethyl alcohol, 23 parts by weight of isopropyl alcohol and 5 parts by weight of the above pigment, and then the mixture was kneaded for 10 hours. In case of application for gravure printing ink, 10 parts by weight of toluene and 10 parts by weight of ethyl alcohol were added to adjust viscosity.

Employing thus obtained gravure ink, a proof printing was carried out on a polypropylene film by a gravure press. In all of the line printing, solid printing and halftone printing, gold colored prints having a metallic luster were obtained. A printability was favorable and also the printed surface remained unchanged after the test of abrasion resistance by using a rubbing tester (JIS L 0849) under a condition of a load of 200 g. and a rubbing of 100 times. The pigment was uniformly dispersed and was stable for a long period.

In a gravure ink prepared by employing a conventional aluminum powder, which was hardly dispersed into the ink, a beautiful print could not be obtained and the printed surface was peeled after rubbing of about 50 times. Leaving it in an air for a long period, the printed surface discolored.

Example 13

A ball mill was charged with 10 parts by weight of the pigment obtained in Example 12, 13 parts by weight of ethyl cellulose, 50 parts by weight of water and 10 parts by weight of denatured alcohol, and the mixture was kneaded for 6 hours to give an aqueous flexiso ink. The pigment could be uniformly dispersed and the obtained ink was favorable. A printed surface remained unchanged after test of abrasion resistance by using a rubbing tester under a condition of a load of 200 g. and rubbing of 100 times. Besides the surface did not discolor for a long period.

Example 14

On an unstretched polypropylene film having a thickness of 20 $\mu$ was applied an under-coating material consisting of 5 parts by weight of maleic acid resin, 15 parts by weight of phenol resin, 5 parts by weight of polyvinyl butyral, 2 parts by weight of ethyl alcohol, 10 parts by weight of n-butyl alcohol, 20 parts by weight of ethyl acetate, 25 parts by weight of toluene and 5 parts by weight of a red organic pigment of azo type. The applied coating was dried by utilizing a hot air dryer of 60° C. for 20 seconds to give an under-coating layer having a thickness of 0.03 $\mu$. Aluminum was deposited onto the under-coating layer under a vacuum of 3 × $10^{-4}$ Torrs at a temperature of 1,500°C. to give an aluminum deposition layer having a thickness of 0.04 to 0.07 $\mu$. Furthermore the same coating material as the under-coating material was applied onto the aluminum deposition layer to give an over-coating layer having a thickness of 0.3 $\mu$.

Thus obtained aluminum leaf was peeled out of the polypropylene film in the same manner described in Example 1 except that the elongating ratio was altered to about 3% and the elongating temperature to a room temperature, and the elongating temperature to a room temperature and then crushed up to give a red pigment having a length and width of 0.3 to 2 $\mu$, a thickness of 0.7 $\mu$ and a specific gravity of 1.4.

A ink for ball-point pen was prepared by mixing the following composition.

| Ingredients | Parts by weight |
| --- | --- |
| Red pigment | 22 |
| Rosin-modified maleic resin | 30 |
| Hexylene glycol | 20 |
| Oleic acid | 7 |
| Butyl cellosolve | 20 |
| Surface active agent | 1 |

The obtained ink was employed for a ball-point pen and gave a beautiful letter having a metallic luster. The ink had a good fluidity and could be employed for writing without any trouble as come to thin.

Example 15

A blue pigment was prepared by the same manner as described in Example 14 except that a blue organic pigment of cyanine type was employed instead of red organic pigment.

A ink for pen-writing of the following composition was prepared.

| Ingredients | Parts by weight |
| --- | --- |
| Blue pigment | 25 |
| Acacia | 3 |
| Polyvinyl alcohol | 1 |
| Glycerin | 1 |
| Surface active agent | 0.5 |
| Salicylic acid | 0.5 |

| Ingredients | Parts by weight |
|---|---|
| Water | 69 |

The obtained ink was employed for pen and fountain pen to obtain a beautiful letter having a metallic luster. The pigment was well dispersed in the ink and the ink had a good fluidity. Then, the written letter did not come to thin at all and showed a good appearance.

Furthermore, a sheet imaged by employing the above ink was clearly duplicated by utilizing duplicator such as Xerox type or diazo type.

Example 16

On the same polyethylene terephthalate film as employed in Example 1 was provided a releasing layer in the same manner as described in Example 1. An under-coating material consisting of 21 parts by weight of epoxy-modified acrylic resin, 4.5 parts by weight of nitrocellulose, 4.5 parts by weight of rosin, 14 parts by weight of methyl isobutyl ketone, 21 parts by weight of toluene, 14 parts by weight of ethyl acetate, 14 parts by weight of ethyl alcohol and 7 parts by weight of n-butyl alcohol was applied on the releasing layer and dried for 40 seconds at 180°C. to give an under-coating layer having a thickness of 1.0 $\mu$. Gold was deposited thereon under a vacuum of about $3 \times 10^{-4}$ Torrs at a temperature of 1,700°C. to give a gold deposition layer having a thickness of 70 m$\mu$. Further, the same coating material as the under-coating material was applied to give an over-coating layer having a thickness of 1.0 $\mu$.

Thus obtained gold leaf was peeled out of the polyethylene terephthalate film in the same manner as described in Example 1 except that the elongating ratio was altered to about 15% and the elongating temperature to about 85°C., and crushed up to give a gold pigment having a length and width of 2 to 50 $\mu$, a thickness of 2.1 $\mu$ and a specific gravity of 1.9.

Example 17

On an unstretched polytetrafluoroethylene film having a thickness of 20 $\mu$ was applied an under-coating material consisting of 15 parts by weight of semi-drying alkyd resin, 9 parts by weight of urea resin, 3 parts by weight of nitrocellulose, 3 parts by weight of rosin-modified maleic resin, 21 parts by weight of ethyl alcohol, 14 parts by weight of ethyl acetate, 28 parts by weight of toluene, 7 parts by weight of n-butyl alcohol and dried for 25 seconds at 140°C. to give an under-coating layer having a thickness of 0.6 $\mu$. Copper was deposited thereon under a vacuum of about $3 \times 10^{-4}$ Torrs at a temperature of 1,650° C. to give a copper deposition layer having a thickness of 50 m$\mu$. Further, the same coating material as the under-coating material was applied to give an over-coating layer having a thickness of 0.6 $\mu$.

Thus obtained copper leaf was peeled out of the polytetrafluoroethylene film in the same manner as described in Example 1 except that the elongating ratio was altered to about 7% and the elongating temperature to a room temperature, and crushed up to give a copper pigment having a length and width of 5 to 100 $\mu$, a thickness of 1.3 $\mu$ and a specific gravity of 2.0.

Example 18

On an unstretched polypropylene film having a thickness of 25 $\mu$ was applied an under-coating material consisting of 18 parts by weight of butylated urea resin, 3 parts by weight of nitrocellulose, 4.4 parts by weight of polyvinyl butyral, 4.5 parts by weight of rosin, 0.1 part by weight of ammonium chloride (catalyst), 21 parts by weight of ethyl alcohol, 17.5 parts by weight of ethyl acetate, 21 parts by weight of toluene, 10.5 parts by weight of n-butyl alcohol and 2 parts by weight of Neozapon Yellow R, made by BASF and dried for 20 seconds at 90°C. to give an under-coating layer having a thickness of 0.7 $\mu$. Aluminum was deposited thereon under a vacuum of about $3 \times 10^{-4}$ Torrs at a temperature of 1,450°C. to give an aluminum deposition layer having a thickness of 65 m$\mu$. Further, the same coating material as the under-coating material was applied to give an over-coating layer having a thickness of 0.7 $\mu$.

Thus obtained aluminum leaf was peeled out of the polypropylene film in the same manner as described in Example 1 except that the elongating ratio was altered to about 3% and the elongating temperature to a room temperature, and crushed up to give a golden yellow pigment having a length and width of 20 to 100 $\mu$, a thickness of 1.5 $\mu$ and a specific gravity of 1.5.

Example 19

On an unstretched polyethylene film having a thickness of 30 $\mu$ was applied an under-coating material consisting of 25 parts by weight of urethane resin, 2.5 parts by weight of nitrocellulose, 2.5 parts by weight of rosin, 17.5 parts by weight of methyl isobutyl ketone, 24.5 parts by weight of toluene, 21 parts by weight of ethyl acetate, 7 parts by weight of cyclohexane and dried for 20 seconds at 90°C. to give an under-coating layer having a thickness of 0.4 $\mu$. Aluminum was deposited thereon under a vacuum of about $3 \times 10^{-4}$ Torrs at a temperature of 1,300°C. to give an aluminum deposition layer having a thickness of 70 m$\mu$. Further, the same coating material as the under-coating material was applied to give an over-coating layer having a thickness of 0.4 $\mu$.

Thus obtained aluminum leaf was peeled out of the polyethylene film in the same manner as described in Example 1 except that the elongating ratio was altered to about 5% and the elongating temperature to a room temperature, and crushed up to give a silver pigment having a length and width of 1 to 30 $\mu$, a thickness of 9 $\mu$ and a specific gravity of 1.4.

Example 20

On an unstretched polyethylene film having a thickness of 30 $\mu$ was applied an under-coating material consisting of 20 parts by weight of vinyl chloride-vinyl acetate copolymer, 100 parts by weight of methyl isobutyl ketone and 100 parts by weight of ethyl acetate and dried for 20 seconds at 80°C. to give an under-coating layer having a thickness of 1.5 $\mu$. Tin was deposited thereon under a vacuum of about $3 \times 10^{-4}$ Torrs at a temperature of 1,450°C. to give a tin deposition layer having a thickness of 50 m$\mu$. Further, the same coating material as the under-coating material was applied to give an over-coating layer having a thickness of 1.5 $\mu$.

Thus obtained tin leaf was peeled out of the polyethylene film in the same manner as described in Example 1 except that the elongating ratio was altered to about 2% and the elongating temperature to a room temperature, and crushed up to give a silver pigment having a length and width of 20 to 100 μ, a thickness of 3.1 μ and a specific gravity of 1.5.

What we claim is:

1. A process for making a light reflective pigment which comprises
   a. coating a base film with a resinous material;
   b. depositing a metal by vapor deposition on the coating;
   c. elongating only the base film at least 1% in air to peel the metal coated with the resinous material from the base film; and
   d. crushing the resulting coated metal leaf into pieces having a length and width within the range of about 0.1 to about 500 μ each, a thickness of about 0.1 to about 4 μ and a true specific gravity of about 1 to about 2.

2. The process of claim 1, wherein said elongating ratio of the base film is from about 1 to about 20%.

3. The process of claim 2, wherein said elongating ratio of about 1 to about 20% is achieved by heating the base film up to an elevated temperature.

4. The process of claim 3, wherein said elevated temperature is an approximate glass transition temperature of the base film employed.

5. The process of claim 1, wherein said base film is a member selected from the group consisting of films made of polyethylene, polypropylene, polyvinyl alcohol, polytetrafluoroethylene, polyester, polyamide polyvinyl chloride, polycarbonate, cellulose acetate, regenerated cellulose.

6. The process of claim 1 wherein the metal coated base film from step (b) is coated with a resinous material prior to step (c) whereby the resulting metal leaf is coated on both sides with resinous material.

7. The process of claim 6 wherein the coatings on the two sides of the metal leaf have the same composition.

8. The process of claim 6 wherein the composition of the two resinous coatings on the metal leaf are different.

9. The process of claim 1, wherein said resinous coating material is made of at least one of thermoplastic resin and thermosetting resin.

10. The process of claim 9, wherein thermosetting resin is employed in the ratio of about 50 to about 200 parts by weight to 100 parts by weight of thermoplastic resin.

11. The process of claim 9, wherein said thermoplastic resin is a member selected from the group consisting of acrylic resin, polyester, polyamide, vinyl chloride-vinyl acetate copolymer, ethylene-vinyl acetate copolymer, polyvinyl butyral, polystyrene, maleic resin, petroleum resin, ester gum, nitrocellulose, ethyl cellulose, cellulose acetate, rosin and shellac.

12. The process of claim 9, wherein said thermositting resin is a member selected from the group consisting of thermosetting type acrylic resin, epoxy resin, urethane resin, urea resin, malamine resin, phenolic resin, alkyd resin and unsaturated polyester resin.

13. The process of claim 1, wherein the metal of said metal deposition layer is a member selected from the group consisting of gold, silver, aluminum, copper, nickel, tin, chromium and zinc.

14. The process of claim 1, wherein said resinous coating layer is colored with colorant.

15. The process of claim 1, wherein said reflexible pigment is about 1 to about 500 μ in length and width, respectively.

16. The process of claim 1, wherein said reflexible pigment is about 3 3 to about 200 μ in length and width, respectively, and about 0.1 to about 2 μ in thickness.

17. The process of claim 1, wherein said reflexible pigment is about 0.1 to about 20 μ in length and width, respectively, and about 0.1 to about 1.5 μ in thickness.

* * * * *

UNITED STATES PATENT AND TRADEMARK OFFICE
CERTIFICATE OF CORRECTION

PATENT NO. : 3,962,397
DATED : June 8, 1976
INVENTOR(S) : HIROSHI NARUI; IKUO AKUNE; TERUMI SHINOHARA; MASAO NUMA; YOSIYA KOBIKI It is certified that error appears in the above-identified patent and that said Letters Patent are hereby corrected as shown below:

Column 7, line 11, change "polystyrenes" to ---polystyrene---

Column 7, lines 20 and 21, change "cellusolve" to ---cellosolve---

Column 7, line 56, change "was" to ---wax---

Column 9, line 15, change "infrased" to ---infrared---

Column 16, line 49, change "9" to ---0.9---

Column 17, line 31, after "polyamide" insert ---,---

Column 18, lines 18 and 19, change "thermositting" to ---thermosetting---

Column 18, line 21, change "malamine" to ---melamine---

Column 18, line 33, change "3 3" to ---3---

Signed and Sealed this

Twenty-sixth Day of October 1976

[SEAL]

Attest:

RUTH C. MASON
*Attesting Officer*

C. MARSHALL DANN
*Commissioner of Patents and Trademarks*